US008862721B2

(12) United States Patent
Wissner-Gross et al.

(10) Patent No.: US 8,862,721 B2
(45) Date of Patent: Oct. 14, 2014

(54) ENVIRONMENTAL FOOTPRINT MONITOR FOR COMPUTER NETWORKS

(76) Inventors: Alexander David Wissner-Gross, Cambridge, MA (US); Timothy Michael Sullivan, Cambridge, MA (US)

( * ) Notice: Subject to any disclaimer, the term of this patent is extended or adjusted under 35 U.S.C. 154(b) by 843 days.

(21) Appl. No.: 12/747,825

(22) PCT Filed: Dec. 15, 2008

(86) PCT No.: PCT/US2008/086804
§ 371 (c)(1),
(2), (4) Date: Jun. 23, 2010

(87) PCT Pub. No.: WO2009/076667
PCT Pub. Date: Jun. 18, 2009

(65) Prior Publication Data
US 2010/0281158 A1    Nov. 4, 2010

Related U.S. Application Data

(60) Provisional application No. 61/013,366, filed on Dec. 13, 2007.

(51) Int. Cl.
*G06F 15/173* (2006.01)
*H04L 12/26* (2006.01)
*G06F 17/30* (2006.01)

(52) U.S. Cl.
CPC .............. *G06F 17/30* (2013.01); *H04L 43/00* (2013.01); *Y02B 60/1289* (2013.01); *Y02B 70/30* (2013.01); *Y02B 60/00* (2013.01)
USPC .......................................... 709/224; 709/223

(58) Field of Classification Search
CPC .... H04L 43/00; Y02B 60/00; Y02B 60/1289; Y02B 70/30; G06F 17/30
USPC .................................................. 709/223–224
See application file for complete search history.

(56) References Cited

U.S. PATENT DOCUMENTS

| | | | | |
|---|---|---|---|---|
| 7,461,120 B1 * | 12/2008 | Artz et al. | ...................... | 709/203 |
| 7,742,830 B1 * | 6/2010 | Botes | .............. | 700/32 |
| 2002/0038245 A1 | 3/2002 | Amano | | |
| 2004/0088355 A1 * | 5/2004 | Hagan et al. | ................. | 709/203 |
| 2005/0060585 A1 | 3/2005 | Murakoshi | | |
| 2006/0161450 A1 | 7/2006 | Carey | | |
| 2007/0094055 A1 | 4/2007 | Nakayama | | |
| 2009/0024737 A1 * | 1/2009 | Goldspink et al. | ............ | 709/224 |

OTHER PUBLICATIONS

International Search Report and Written Opinion in related international application PCT/US2008/086804 mailed Jun. 23, 2009 (10 pages).

* cited by examiner

*Primary Examiner* — Joon H Hwang
*Assistant Examiner* — Suraj Joshi
(74) *Attorney, Agent, or Firm* — Brown Rudnick LLP; Mark S. Leonardo

(57) ABSTRACT

A system and method for obtaining an environmental footprint of a website are presented. The system includes a website embedded with a unique identifying tag, a user terminal to view the website, an environmental footprint server which identifies the unique identifying tag of the website, and a processor to calculate the environmental footprint of the website based upon time data and the average emissions emitted by a user terminal, the server hosting the website and a network connecting the user terminal and the server.

9 Claims, 2 Drawing Sheets

ENVIRONMENTAL FOOTPRINT MONITOR FOR COMPUTER NETWORKS

CROSS-REFERENCE TO RELATED APPLICATIONS

This patent application claims priority to U.S. Provisional Application Ser. No. 61/013,366, filed in the U.S. Patent and Trademark Office on Dec. 13, 2007 by Wissner-Gross et al., the entire contents of this application being incorporated herein by reference in its entirety.

BACKGROUND

1. Technical Field

The present disclosure relates to a method and a system for monitoring environmental footprints. In particular, the present disclosure is directed to a method and a system for monitoring environmental footprints attributable to a website, an electronic mail and other pieces of data.

2. Description of the Related Art

Information and communication technologies (ICT) account for an increasing portion of world electricity consumption. However, emissions data are lacking on a per-device basis due to a lack of systematic monitoring. Because existing statistics are primarily available in aggregate form, fine-grained ownership and management of environmental footprints at the single-device level remain unknown and challenging.

SUMMARY

According to an embodiment of the present disclosure, a method for obtaining an environmental footprint of a website is presented. The method includes the steps of viewing a website embedded with a uniquely identified tag that is hosted on a server, identifying the unique identifying tag associated with the server and the website, placing a cookie on a user terminal used in the step of viewing a website, updating the cookie on the user terminal with time data determined each time the website is viewed, updating an environmental footprint detection database with time data associated with the website each time the website is viewed, and calculating the environmental footprint of the website using the time data and an average of emissions of the user terminal, the server and a network connecting the user terminal and the server.

According to another embodiment of the present disclosure, a system for obtaining an environmental footprint of a website is presented. The system includes a website and a user terminal to view the website. The website is embedded with a unique identifying tag and is hosted on a server. The system further includes a network that connects the user terminal and the server, an environmental footprint server and a processor. The environmental footprint server identifies a website and places a cookie on the user terminal. The processor of the system calculates the environmental footprint of the website using time data and an average of emissions of the user terminal, the server and the network.

According to yet another embodiment of the present disclosure, a method for obtaining an environmental footprint of a piece of data is presented. The method includes the steps of accessing the data, where the data is associated with a server embedded with a unique identifying tag. The method also includes identifying the unique identifying tag associated with the server and the data, placing a cookie on a user terminal used in the step of accessing the data and updating the cookie on the user terminal with time data determined each time the data is accessed. Further, the method includes updating an environmental footprint detection database with time data associated with the data each time the data is accessed and calculating the environmental footprint of the data using the time data and an average of emissions of the user terminal, the server embedded with a unique identifying tag and a network connecting the user terminal and the server.

BRIEF DESCRIPTION OF THE DRAWINGS

The objects and features of the present disclosure, which are believed to be novel, are set forth with particularity in the appended claims. The present disclosure, both as to its organization and manner of operation, together with further objectives and advantages, may be best understood by reference to the following description, taken in connection with the accompanying drawings as set forth below:

DETAILED DESCRIPTION OF EXEMPLARY EMBODIMENTS

The following detailed description refers to the accompanying drawings. The same reference numbers in different drawings may identify the same or similar elements. In addition, the following detailed description does not limit the present disclosure.

The present disclosure relates to a method and a system for monitoring environmental footprints. In particular, the present disclosure is directed to a method and a system for monitoring environmental footprints attributable to a website, an electronic mail and other pieces of data.

The present invention introduces a monitoring framework that brings detailed energy and environmental analytics to the World Wide Web (WWW). An embodiment of the present invention is a software tool that calculates the comprehensive environmental footprint of an online experience, including the client, network and server contributions.

Figure 1:
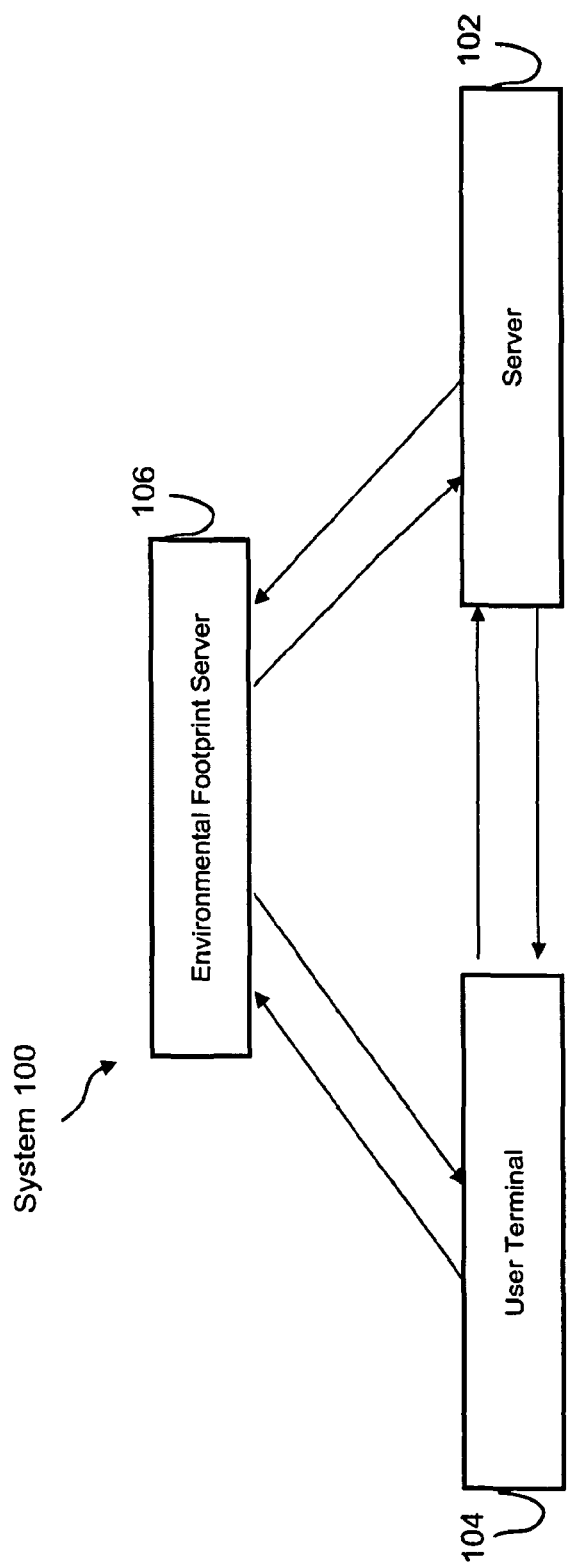
FIG. 1 is a diagram of a system for obtaining an environmental footprint of a website, according to the present disclosure.

Referring to FIG. 1, a diagram of a system 100 for obtaining an environmental footprint is presented. In this particular embodiment, the environmental footprint is obtained from the use of a website, however, the present invention may obtain the environmental footprint of an electronic mail, and other various pieces of data. System 100 is generally comprised of a server 102, a user terminal 104, an environmental footprint server 106, and a processor (not shown in Figure).

Server 102 is medium which hosts any website that is accessible through the WWW. A website stored on server 102 may include at least one tag that is used to uniquely identify the website. In an example of a client-server model, a user is presented with an Internet browser (i.e., Internet Explorer and Mozilla) through user terminal 104. User terminal 104 may be, for example, a personal digital assistant (PDA), a computer, or an electronic mail.

A user may input a specific website address, such as http://www.yahoo.com, into an Internet browser on user terminal 104 and await a response from server 102. Upon receiving a website from server 102, which includes a unique identifying tag, user terminal 104 contacts environmental footprint server 106 to determine the identity of such tag. The tag may be accompanied by parameters such as the display resolution of the user terminal, the dimensions of the browser window displaying the website and/or the specific uniform resource locator (URL) of the current page within the website. User terminal 104 may also contact server 106 at regular intervals after the response from server 102. Environmental footprint server 106 may subsequently place a cookie on user terminal 104 to track the user's usage of the website. Environmental footprint server 106 updates the cookie on user terminal 104 upon each subsequent visit by the user to the same website and at regular intervals after each visit. In an embodiment of the present disclosure, environmental processor server 106 maintains a database to record the interval of time between each instance of updating a cookie on user terminal 104. In this particular instance, if the user does not visit a uniquely identified website within a pre-determined period of time, environmental footprint server 106 automatically calculates an estimated interval time in which the user terminal 104 may have presented the website to the user.

The processor of system 100 is used to perform at least one calculation to determine the environmental footprint of user terminal 104 and server 102. The calculation may be, for example, the measurement of carbon dioxide emissions by user terminal 104 and server 102 for each user visit to a uniquely identified website. In an embodiment of the present disclosure, the processor of system 100 calculates the carbon dioxide emissions of user terminal 104 and server 102 by multiplying the amount of time user terminal 104 displayed a specific website by the global average of emissions emitted by user terminal 104 and server 102. In another embodiment of the present disclosure, the processor of system 100 calculates separately and sums the carbon dioxide emissions due to the display over time of the website on user terminal 104. The computation is performed by the central processing unit of the user terminal 104 in order to download and render the website, the network carrying the website data between user terminal 104 and server 102, and the server 102 providing the website data. Each contribution to emissions may be calculated from parameters including the amount of time user terminal 104 is allowed to display a specific website, a fraction of the display on user terminal 104 occupied by the website in the browser window, the global average emission rate from displays of that type, the CPU and operating system of user terminal 104, the web browser type of user terminal 104, the geographic location of user terminal 104, the time required to download parts and the whole of the website from server 102 to system 100, the download size of the website from server 102 to system 100, the location of server 102, the sharing and virtualization status of server 102 and the network path between server 102 and user terminal 104. The processor may subsequently present the result of the calculation to the user on user terminal 104.

Figure 2:
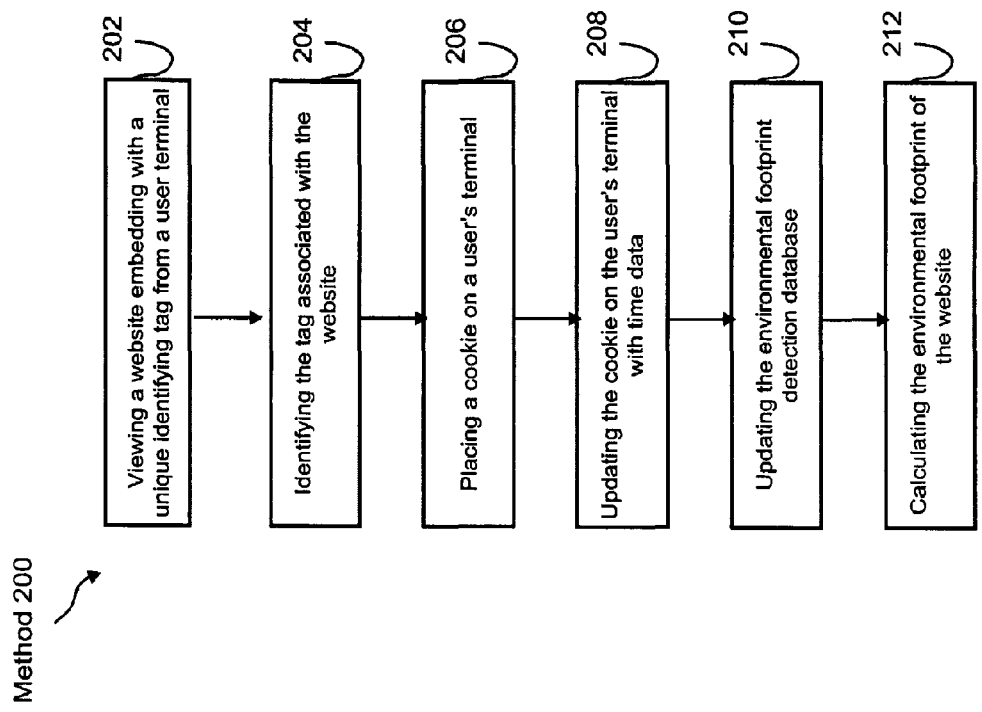
FIG. 2 is a functional block diagram of a method for obtaining an environmental footprint of a website, according to the present disclosure.

Referring to FIG. 2, a functional block diagram of a method 200 for obtaining an environmental footprint of a website is presented. Method 200 provides a means for informing a user of the emissions generated from the user's usage of a uniquely identified website through user terminal 104. Method 200 may include, but is not limited to, the following steps, which are not limited to any particular order.

At step 202, a user may request a website through an Internet browser on user terminal 104. The requested website may be embedded with a unique identifying tag and hosted on remote server 102. Remote server 102 may return the requested website to user terminal 104. User terminal 104 may then contact environmental footprint server 106 to determine the identity of the uniquely identified tag of the requested website.

At step 204, the tag associated with the requested website is identified by environmental footprint server 106. At step 206, environmental footprint server 106 places a tracking cookie on user terminal 104. The cookie of step 206 may contain data such as the time and date a user accessed a specific website. In an embodiment of the present disclosure, the time data of the cookie is updated each time the user refreshes or navigates any portion of the requested website.

At step 208, environmental footprint server 106 updates the time data of a cookie each time a website is viewed. In an embodiment of the present disclosure, the time data of the cookie is updated each time the user refreshes or navigates any portion of the requested website.

At step 210, time data of a cookie stored in a database stored on environmental footprint server 106 is updated upon each subsequent visit to the website by user terminal 104. At step 212, a processor calculates the environmental footprint of a website based upon the time data recorded in the database of environmental footprint server 106. The calculation of the environmental footprint may be determined by multiplying the time data of user terminal 104 by the average emissions of user terminal 104 and the average emissions of server 102.

The calculation of the environmental footprint of a website of method 200 may include other variables. For example, the environmental footprint of a website may be adjusted based upon the type of user terminal 104, the viewing area of user terminal 104, the network connection and bandwidth between server 102 and user terminal 104, the geographic location of user terminal 104 and server 102, and the power supply of server 102. In an embodiment of the present disclosure, the calculation of the environmental footprint includes the type of fuel mixes used for electricity generation in the geographic location of user terminal 104 and server 102. In another embodiment, the environmental footprint of a website includes the measurements of greenhouse gases such as nitrous and sulfur oxides, and water usage.

It is contemplated that the data derived from obtaining an environmental footprint of a website may be used for other environmental applications. For example, the data of the environmental footprint may be used in conjunction with a renewable energy certificate purchasing system that allows website and/or server owner to neutralize any penalties or fees assessed as a result of emitted carbon dioxide emissions. In another example, the data may be used to improve the routing of power to servers hosting websites in various regions. In yet another example, the data may be used to improve the management of emissions between user terminals and servers.

No element, act, or instruction used in the present application should be construed as critical or essential to the present disclosure unless explicitly described as such. In addition, as used herein, the article "a" is intended to include one or more items. Where only one item is intended, the term "one" or similar language is used.

It will be understood that various modifications may be made to the embodiments disclosed herein. Therefore, the above description should not be construed as limiting, but merely as exemplifications of the various embodiments of the present disclosure. Those skilled in the art will envision other modifications within the scope and spirit of the claims appended hereto.

What is claimed is:

1. A method for obtaining an environmental footprint from a user's use of a website, the method comprising the steps of:
viewing a specific website by using a user terminal connected by a network to a server embedded with a unique identifying tag;

establishing contact between the user terminal and an environmental footprint server comprising an environmental footprint detection database, wherein the environmental footprint associated with the viewing of the specific website by a user is defined to include contributions to carbon dioxide emission while the specific website is viewed, the contributions to carbon dioxide emissions from: the user terminal, the server, and the network connection to the server;

identifying the unique identifying tag associated with the server and the specific website;

placing, by means of the environmental footprint server, a cookie on the user terminal used in the step of viewing the specific website;

updating the cookie on the user terminal with time data determined each time the specific website is viewed;

updating the environmental footprint detection database with time data associated with the specific website each time the specific website is viewed to determine an amount of time the user terminal displayed the specific website;

obtaining and storing in the environmental footprint detection database:
   an average for emissions of the user terminal,
   a location of the user terminal,
   an average for emissions of the server,
   a location of the server,
   an average for emissions of the network connection,
   a data transfer amount for the network connection;

calculating a comprehensive environmental footprint associated with the viewing of the specific website by using
   the amount of time the user terminal displayed the specific website,
   a time required to download parts and the whole of the website from the server to the user terminal,
   the average for emissions of the user terminal,
   the location of the user terminal,
   the average for emissions of the server,
   the location of the server,
   the average for emissions of the network connection, and
   the data transfer amount for the network connection; and
presenting the result of the calculation to a user on the user terminal.

2. The method of claim 1, wherein the calculating the comprehensive environmental footprint also uses a fraction of a display on the user terminal occupied by the specific website in a browser window.

3. The method of claim 2, wherein the calculating the comprehensive environmental footprint also uses a global average emission rate from a display of the type associated with the user terminal.

4. The method of claim 2, wherein the calculating the comprehensive environmental footprint also uses a web browser type of the user terminal.

5. The method of claim 1, wherein the step of calculating includes the product of an amount of time spent on the website and a regional average of emissions for the user terminal and the server.

6. The method of claim 1, wherein the time data includes an amount of time spent on the web site and a period of time in between visits to the website.

7. A system for obtaining an environmental footprint of a website, the system comprising:
   a website that runs on a server embedded with a unique tag identifying the website;
   a user terminal used by a user to view the website;
   a network connecting the user terminal and the server;
   an environmental footprint server comprising an environmental footprint detection database, wherein a website-viewing footprint is defined to include contributions to emissions while the website is viewed, the contributions to emissions from: the user terminal, the server, and the network,
   wherein the environmental footprint server identifies the website, places a cookie on the user terminal, determines and updates the environmental footprint detection database to include:
      an amount of time the user terminal displayed the website,
      an average for emissions of the user terminal,
      a location of the user terminal,
      an average for emissions of the server,
      a location of the server,
      an average for emissions of the network,
      a data transfer amount for the network; and
   a processor that calculates a comprehensive environmental footprint associated with the viewing of the website by using
      the amount of time the user terminal displayed the website,
      the average for emissions of the user terminal,
      the location of the user terminal,
      the average for emissions of the server,
      the location of the server,
      the average for emissions of the network,
      the data transfer amount for the network, and
      a time required to download parts and the whole of the website from the server to the user terminal, and further wherein the processer presents the result of the calculation to the user on the user terminal.

8. The system of claim 7, wherein the processor calculates the comprehensive environmental footprint by also using a viewing area of the user terminal.

9. The system of claim 7, wherein the processor calculates the comprehensive environmental footprint by also using a web browser type of the user terminal.

* * * * *